July 14, 1959  R. LEPOUTRE ET AL  2,894,634
CENTRIFUGES
Filed April 8, 1957  2 Sheets-Sheet 1

Inventors
Raymond Lepoutre and
Auguste Gautier
By Michael S. Striker

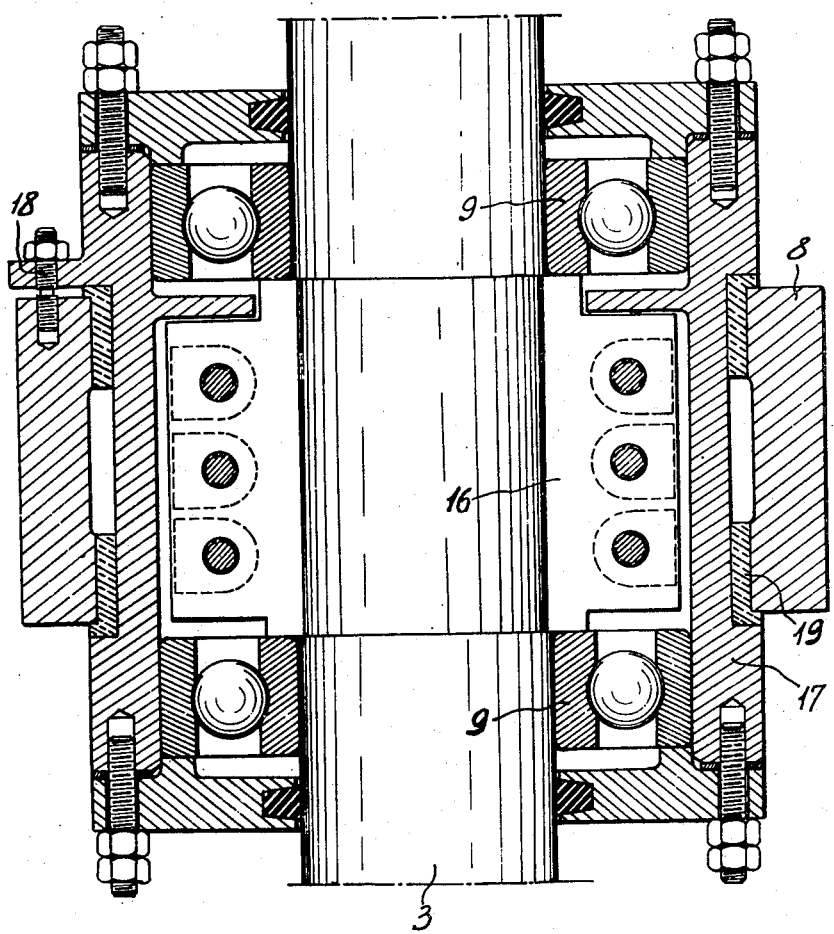

United States Patent Office 2,894,634
Patented July 14, 1959

2,894,634
CENTRIFUGES

Raymond Lepoutre and Auguste Gautier, Paris, France, assignors to Societe des Raffineries & Sucreries Say, Paris, France, an anonymous society of France Application April 8, 1957, Serial No. 651,200

Claims priority, application France January 30, 1957

7 Claims. (Cl. 210—375)

This invention relates to centrifuges of the type having a rotary basket suspended on a vertical shaft such as are employed for example in the manufacture of sugar.

In this type of centrifuge the product to be centrifuged is poured into the suspended basket, which is rotated rapidly. When the product has been sufficiently centrifuged, the basket is emptied while rotating at high speed, and the side walls thereof are scraped by means of a scraper which is introduced into the interior of the basket.

The scraper is slidably mounted on a rod which is supported by the fixed vat or the frame of the machine. Consequently, the scraper is fixed during the emptying of the basket, while the latter can rock on its suspension. The side walls of the basket can thus come into contact with the scraper and may be torn thereby.

Attempts have been made to obviate this disadvantage by disposing the scraper with sufficient clearance, but in this case an adequate scraping of the basket cannot be effected.

The present invention aims to obviate the aforesaid disadvantage and consists in mounting the scraper on a rotating part of the centrifuge instead of on the fixed parts (frame or vat containing the basket), and in preventing its rotation therewith.

Preferably, the scraper is mounted on the basket itself or on the shaft by means of which the basket is suspended and driven.

More especially, the rod controlling the scraper is mounted on a supporting arm which is mounted loosely on the shaft driving the basket, a fixed abutment being provided to prevent the said cross-member from being driven by the rotation of the shaft.

The supporting arm is, for example, U-shaped and the abutment, which is fixed to the vat of the centrifuge, is disposed between the arms of the U.

The arm is mounted on the driving shaft of the basket by means of a sleeve and a ball bearing, and in order to avoid accidents, the sleeve is connected to the ball bearing by a shear pin or the like.

An example in accordance with the invention will now be described with reference to the accompanying drawings in which:

Figure 4 is a section along the line IV—IV of Figure 1.

Figure 1:
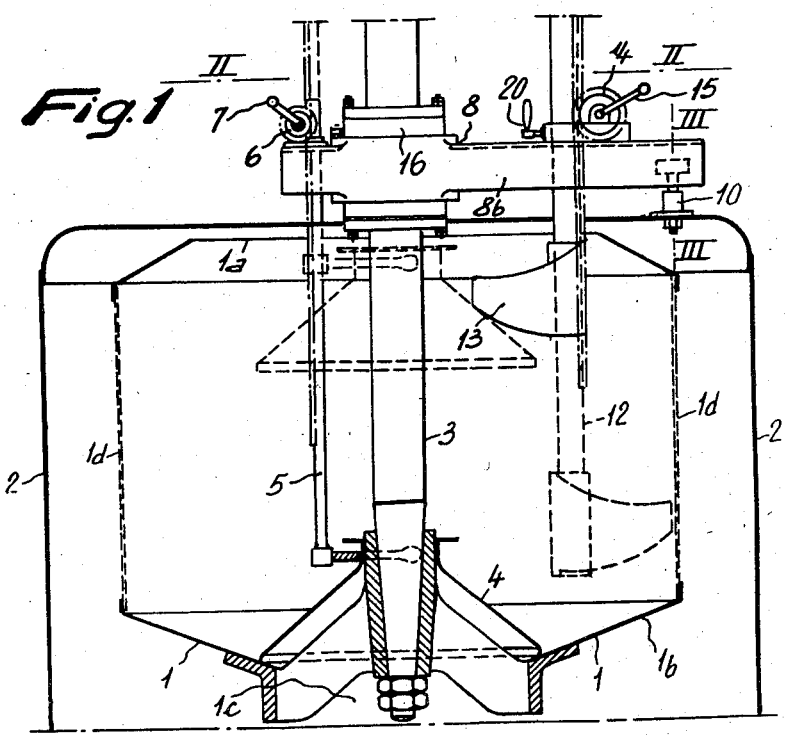
Figure 1 is an axial section through a centrifuge according to the present invention.
Figure 2:
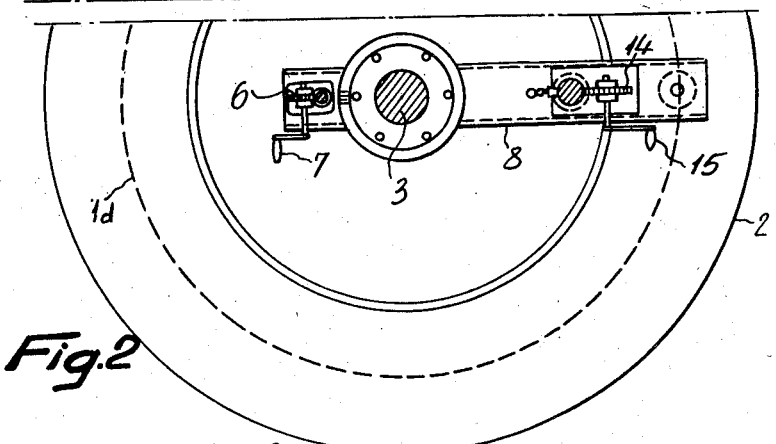
Figure 2 is a fragmentary view from above.
Figure 3:
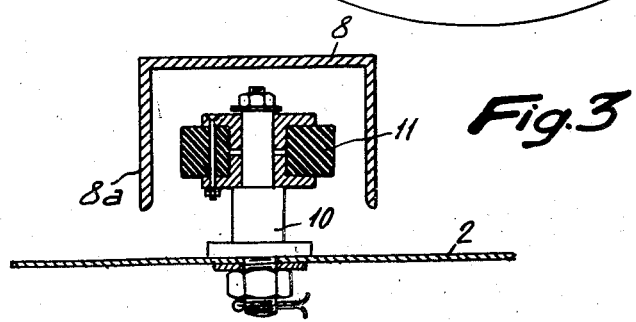
Figure 3 is a section along the line III—III of Figure 1.

In the centrifuge illustrated in Figure 1 a basket 1 has at its upper end an orifice 1a, at its lower end a base 1b formed with an orifice 1c and side walls 1d formed by a screen or strainer. The basket is disposed within a vat 2 and is fast with a vertical shaft 3, which imparts thereto a rotational movement about its axis. A valve 4 closes the orifice 1c of the basket and is adapted to slide on the end of the shaft 3. The valve 4 is fast with a toothed rack 5, which meshes with a pinion 6 controlled by a crank 7 and thus adapted to move it from the position illustrated in solid lines in Figure 1 into the position illustrated in broken lines. This device for the control of the valve 4 is mounted on a U-shaped supporting arm 8.

The arm 8 is connected to the shaft 3 so that it is freely rotatable on it. The shaft 3 supports a sleeve 16 (Figure 4) disposed between two ball bearings 9. The outer casing 17 of the bearings is fast with the cross-member 8 only through a shear bolt 18. A bronze ring 19 is disposed between the casing 17 and the arm 8 so that should the bearing 9 seize and the bolt 18 fracture the shaft can still rotate within the arm.

The end of the arm 8 opposite to that on which the mechanism 5, 6, 7, is mounted is in the form of an inverted U and fits over a pin 10 fast with the vat 2 and provided with a rubber washer 11. The said pin 10 prevents rotation of the arm 8 by the driving shaft 3. The diameter of the washer 11 and the distance between the vertical arms 8a of the arm 8 are such as to permit a limited rocking of the basket 1 relative to the vat 2.

Mounted on the arm 8b of the arm 8 is a rod 12 which supports the scraper blade. The said rod 12 is in the form of a toothed rack and can be controlled by a toothed pinion 14 and a crank 15, so that the blade 13 can move from the position illustrated in solid lines in Figure 1 to the position illustrated in broken lines. The assembly comprising the rod 12 and its accessories 13, 14, 15, is mounted on a plate pivoting on the arm 8. It is thus possible to pivot the plate in such manner as to bring the blade 13 either into its operative position (position shown in broken lines) or into the inoperative position (position shown in solid lines). A hand screw 20 permits of fixing the rod 12 in either of these positions.

Under these conditions, it will readily be appreciated that, with the shafts 3 and 12 in parallel relationship, the blade 13 follows the rocking movements of the basket and is not likely to tear the side walls 1d of the latter when the basket rocks during the emptying operation.

As an alternative the scraper 13 could be mounted on the basket 1. Also, it could be so arranged that the breaking of the bolt 18 causes the breaking of the electric circuit of the motor driving the shaft 3, and the valve 4 and the scraper could be operated by automatic control devices with safety means.

The arm 8, or other supports serving the same purpose, instead of being entirely supported by one of the movable members of the centrifuge (the shaft 3 in the case of the drawing), may be supported partly by a movable element of the centrifuge and partly by a fixed element of the centrifuge, for example by means of springs, the guiding still being effected by the movable element. The arm 8 may even be entirely supported by a fixed element, such for example, as supporting means fast with the vat 2, in the form of portions of spheres having as their centre the centre of rotation of the movable part on which the ends of the arm 8 would rest, the latter again being guided by the shaft 3.

What we claim is:

1. In a centrifuge having a rotatable centrifuge unit composed of a basket member symmetrically mounted on a rotating shaft member for rotation therewith and for movement therewith in radical direction, in combination, scraper means located in said basket member for scraping the inner wall surface thereof; mounting means mounting said scraper means exclusively on said rotatable centrifuge unit only for sliding movement in a direction parallel to the axis of said shaft member and for turning movement about said shaft member without any possibility of tilting relative thereto, whereby the relative position between said scraper means and said basket member will not be changed during movement of the latter in radial direction so that damaging of said basket member by said scraper means during such movement is avoided; and locking means preventing rotation of said mounting means about said axis, said locking means engaging said mounting means only along faces substantially parallel to said axis, whereby during movement of said basket member in radial direction any straining of said shaft member and said mounting means is avoided.

2. In a centrifuge having a substantially cylindrical basket mounted coaxially on a rotating shaft for rotation therewith and for movement therewith in radial direction, in combination, scraper means located in said basket for scraping the inner wall surface thereof; mounting means engaging said shaft substantially without clearance and being rotatable about the axis of said shaft for mounting said scraper means on said shaft only for sliding movement in a direction parallel to the shaft axis and for turning movement about said shaft without any possibility of tilting relative thereto, whereby the relative position of said scraper means and said basket will not be changed during movement of the latter in radial direction so that damaging of said basket by said scraper means during such movement is avoided; and locking means preventing rotation of said mounting means about said axis, said locking means engaging said mounting means only along faces substantially parallel to said axis, whereby during movement of said basket in radial direction any straining of said shaft and said mounting means is avoided.

3. In a centrifuge having a substantially cylindrical basket mounted coaxially on a rotating shaft for rotation therewith and for movement therewith in radial direction, in combination, scraper means located in said basket for scraping the inner wall surface thereof; a mounting arm extending at a fixed angle from said shaft and being fastened adjacent one end thereof substantially without clearance to said shaft to be rotatable about said shaft axis without being tiltable relative thereto and carrying adjacent the other end thereof said scraper means, whereby the relative position of said scraper means and said basket will not be changed during movement of the latter in radial direction so that damaging of said basket by said scraper means during such movement is avoided; and locking means preventing rotation of said mounting means about said axis, said locking means engaging said mounting means only along faces substantially parallel to said axis, whereby during movement of said basket in radial direction any straining of said shaft and said mounting arm is avoided.

4. In a centrifuge having a substantially cylindrical basket mounted coaxially on a rotating shaft for rotation therewith and for movement therewith in radial direction, in combination, scraper means located in said basket for scraping the inner wall surface thereof; a mounting arm extending at a fixed angle of substantially 90° from said shaft and being fastened adjacent one end thereof substantially without clearance to said shaft to be rotatable about said shaft axis without being tiltable relative thereto and carrying adjacent the other end thereof said scraper means, whereby the relative position of said scraper means and said basket will not be changed during movement of the latter in radial direction so that damaging of said basket by said scraper means during such movement is avoided; and locking means preventing rotation of said mounting means about said axis, said locking means engaging said mounting means only along faces substantially parallel to said axis, whereby during movement of said basket in radial direction any straining of said shaft and said mounting arm is avoided.

5. In a centrifuge having a substantially cylindrical basket mounted coaxially on a rotating shaft for rotation therewith and for movement therewith in radial direction, in combination, scraper means located in said basket for scraping the inner wall surface thereof; a mounting arm extending at a fixed angle of substantially 90° from said shaft and being fastened adjacent one end thereof substantially without clearance to said shaft to be rotatable about said shaft axis without being tiltable relative thereto and carrying adjacent the other end thereof said scraper means, whereby the relative position of said scraper means and said basket will not be changed during movement of the latter in radial direction so that damaging of said basket by said scraper means during such movement is avoided, said mounting arm being formed at said other end thereof with a cutout defining a pair of opposite faces extending substantially parallel to the axis of said shaft; and locking means preventing rotation of said mounting means about said axis, said locking means being located between said opposite faces at said other end of said mounting arm and engaging said arm only along one of said faces to prevent thereby rotation of said mounting arm about said axis, whereby during movement of said basket in radial direction any straining of said shaft and said mounting arm is avoided.

6. In a centrifuge having a substantially cylindrical basket mounted coaxially on a rotating shaft for rotation therewith and for movement therewith in radial direction, in combination, scraper means located in said basket for scraping the inner wall surface thereof; a mounting arm extending at a fixed angle of substantially 90° from said shaft and being fastened adjacent one end thereof substantially without clearance to said shaft to be rotatable about said shaft axis without being tiltable relative thereto and carrying adjacent the other end thereof said scraper means, whereby the relative position of said scraper means and said basket will not be changed during movement of the latter in radial direction so that damaging of said basket by said scraper means during such movement is avoided, said mounting arm being formed at said other end thereof with a cutout defining a pair of opposite faces extending substantially parallel to the axis of said shaft; and locking means preventing rotation of said mounting means about said axis, said locking means being in the form of a roller located between said opposite faces at said other end of said mounting arm and engaging said arm only along one of said faces to prevent thereby rotation of said mounting arm about said axis, whereby during movement of said basket in radial direction any straining of said shaft and said mounting arm is avoided.

7. In a centrifuge having a substantially cylindrical basket mounted coaxially on a rotating shaft for rotation therewith and for movement therewith in radial direction, in combination, scraper means located in said basket for scraping the inner wall surface thereof; roller bearing means mounted on said shaft; a sleeve surrounding coaxially therewith said roller bearing means and tightly engaging the outer surface thereof so as to be rotatable about the axis of said shaft; a mounting arm fixed at one end thereof to said sleeve in a manner so as to be turnable about the axis of said sleeve without being tiltable in a plane passing through said axis and carrying adjacent the other end thereof said scraper means, said mounting arm being formed at said other end thereof with a cutout defining a pair of opposite faces extending substantially parallel to the axis of said shaft; a shear pin fixed at opposite end thereof respectively to said arm and to said sleeve so that said arm will rotate together with said sleeve; and locking means preventing rotation of said mounting means about said axis, said locking means being in the form of a roller located between said opposite faces at said other end of said mounting arm and engaging said arm only along one of said faces to prevent thereby rotation of said mounting arm about said axis, whereby damaging of said basket by said scraper means during movement of said basket in radial direction is avoided.

References Cited in the file of this patent

UNITED STATES PATENTS

| | | |
|---|---|---|
| 1,474,331 | Robertson | Nov. 13, 1923 |
| 1,870,153 | Thoman | Aug. 2, 1932 |